(12) United States Patent
Lu et al.

(10) Patent No.: US 9,824,201 B2
(45) Date of Patent: Nov. 21, 2017

(54) METHOD FOR JAVA APPLICATION TO ACCESS INTELLIGENT KEY APPARATUS

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

(*) Notice: Subject to any disclaimer, the term of this patent is extended or adjusted under 35 U.S.C. 154(b) by 0 days.

(21) Appl. No.: 14/394,593

(22) PCT Filed: Nov. 27, 2013

(86) PCT No.: PCT/CN2013/087916
§ 371 (c)(1),
(2) Date: Oct. 15, 2014

(87) PCT Pub. No.: WO2014/101610
PCT Pub. Date: Jul. 3, 2014

(65) Prior Publication Data
US 2015/0294102 A1    Oct. 15, 2015

(30) Foreign Application Priority Data

Dec. 27, 2012 (CN) .......................... 2012 1 0580998

(51) Int. Cl.
G06F 21/34 (2013.01)
G06F 21/14 (2013.01)
(Continued)

(52) U.S. Cl.
CPC ............ *G06F 21/34* (2013.01); *G06F 9/4425* (2013.01); *G06F 21/14* (2013.01); *G06F 9/45504* (2013.01)

(58) Field of Classification Search
CPC ...... G06F 21/57–21/577; G06F 21/606; G06F 21/64; G06F 21/71–21/805
See application file for complete search history.

(56) References Cited

U.S. PATENT DOCUMENTS

| | | | |
|---|---|---|---|
| 2005/0149914 A1* | 7/2005 | Krapf | .................... G06F 9/4428 717/136 |
| 2008/0091601 A1* | 4/2008 | Green | ................ G06Q 20/1085 705/43 |

(Continued)

*Primary Examiner* — Kevin Bechtel
(74) *Attorney, Agent, or Firm* — Hammer & Associates, P.C.

(57) ABSTRACT

A method for a java application to access an intelligent key apparatus. The apparatus comprises: a java application calling a JNI interface; obtaining a corresponding lower level interface function according to a correspondence table of a JNI interface function and the lower level interface function; converting a source parameter list of the JNI interface function into a target parameter list of the corresponding lower level interface function according to the target parameter list of the lower level interface function; calling a lower level interface; accessing an intelligent key apparatus; obtaining a returned result; and returning a value of the returned result to the java application. By means of the method in the present invention, it is not easy to obtain a source code by decompiling a java application, thereby improving the security of the java application accessing an intelligent key apparatus.

13 Claims, 6 Drawing Sheets

(51) Int. Cl.
   *G06F 9/44*    (2006.01)
   *G06F 9/455*   (2006.01)

(56) References Cited

U.S. PATENT DOCUMENTS

| | | |
|---|---|---|
| 2012/0159152 A1 | 6/2012 | Ha et al. |
| 2013/0010955 A1* | 1/2013 | Lu .................... H04L 63/0485 380/255 |
| 2014/0026214 A1* | 1/2014 | Adams .................. G06F 21/54 726/22 |

* cited by examiner

METHOD FOR JAVA APPLICATION TO ACCESS INTELLIGENT KEY APPARATUS

TECHNICAL FIELD

The present invention relates to a method for accessing a smart key device by a java application, belonging to information security field.

BACKGROUND TECHNOLOGY

A smart key device is a device with a USB interface in double-factor authentication mode, with a low cost and convenient application. With a built-in single chip microcomputer or a smart key device chip, the smart key device can store a user key or a digital certificate, and authenticate identity of a user by a cipher text algorithm in it. The smart key device also has functions such as email encrypting, digital signature, security certificate, safely networking logon and SSL security networking accessing with a feature of ensuring private key of the user to be always with its hardware and anti-attack physically, and therefore has high security.

Although a Java application can access the smart key device directly, the feature with the java language makes source codes being easily obtained by decompilation, and therefore has security risk with low accessing security.

SUMMARY OF THE INVENTION

The object of the present invention is to provide a method for accessing a smart key device storing a digital certificate which can be accessed by a java application on a computing device, said method comprises the steps of:

wherein the smart key device has a lower layer interface with target parameters that is invoked by a JNI (Java Native Interface) interface from the computing device, the computing device comprises a table that includes a source parameter list and has one preset JNI interface function corresponding to one lower layer interface function;

calling a JNI interface function by an invoking part;

Step 101, obtaining a source parameter list by the JNI interface;

Step 102, determining a lower layer interface function corresponding to the JNI interface function according to the table;

Step 103, determining a target parameter list according to the lower layer interface function which comprises parameters;

Step 104, sending a value of the source parameter list to the corresponding lower layer interface parameter according to the target parameter list of the lower layer interface;

Step 105, invoking the lower layer interface and accessing the smart key device so as to obtain a returned result; and Step 106, sending the returned result obtained as above to the invoking part;

discarding an exception, and then ending if the returned result is not correct.

Preferably, in Step 102, there are a plurality of interface function pairs in the table in which one preset JNI interface function corresponds to one low layer interface function, and there are one JNI interface function and one low layer interface function corresponding to the JNI interface function in each interface function pair, and in case that one JNI interface function is invoked, the corresponding low layer interface function is searched according to the table in which one JNI interface function corresponds to one low layer interface function.

Preferably, in Step 104, in case that type required by the low layer interface is a pre-defined simple type, searching a first preset mapping table according to the pre-defined simple type required by the low layer interface and a parameter of the pre-defined local type in a source parameter list, obtaining a type pair including the parameter of the pre-defined local type from the first preset mapping table so as to obtain the pre-defined simple type required by the low layer interface function corresponding to the predefined local type, and obtaining the parameter required by the low layer interface by compulsory type conversion.

Preferably, in Step 104, in case that the type required by the low layer interface function is a complex type, searching a second preset mapping table according to the pre-defined complex type required by the low layer interface and a parameter of the pre-defined reference type in a source parameter list, obtaining a type pair including the parameter type of the pre-defined reference type from the second preset mapping table, so as to obtain the pre-defined complex type required by the low layer interface corresponding to the pre-defined reference type.

Preferably, Step 104 comprises following steps:

Step 104-1, obtaining a parameter length of the pre-defined reference type from the source parameter list, and allocating a first buffer according to the parameter length;

Step 104-2, storing the parameter of the pre-defined reference type in the source parameter list into the first buffer;

Step 104-3, allocating a second buffer for the stored data in the low layer interface; and Step 104-4, storing the stored data into the second buffer.

Preferably, Step 106 comprises:

Step 106-1, determining whether the returned result is correct, if yes, going to Step 106-2; otherwise, discarding an exception, and then ending;

Step 106-2, returning a value of the returned result to an invoking part.

Preferably, Step 106-1 comprises:

determining whether the returned result of the low layer interface is the pre-defined Successful, if yes, determining that the returned result is correct and going to Step 106-2; otherwise, determining that the returned result is not correct, discarding an exception, and then ending all process.

Preferably, the discarding an exception comprises:

Step A, obtaining an invoking part exceptional type according to a parameter in the source parameter list;

Step B, instantiating the invoking part exception according to the parameter in the source parameter list; and Step C, discarding the exception for the invoking part according to the parameter in the source parameter list.

Preferably, the discarding an exception comprises:

Step A, obtaining an invoking part exceptional type according to a parameter in the source parameter list;

Step B, instantiating the invoking part exception according to the parameter in the source parameter list; and Step C, discarding the exception for the invoking part according to the parameter in the source parameter list.

Preferably, the discarding an exception comprises:

Step A, obtaining an invoking part exceptional type according to a parameter in the source parameter list;

Step B, instantiating the invoking part exception according to the parameter in the source parameter list; and Step C, discarding the exception for the invoking part according to the parameter in the source parameter list.

Preferably, the returning the returned result to the invoking part obtained in Step 106 comprises:

Step S1, obtaining the invoking part type;

Step S2, creating the type instance;

Step S3, sending a content returned by the low layer interface to the type instance; and Step S4, returning the created type instance to the invoking part.

Preferably, Step S3 comprises:

Step S3-1, obtaining a first address in where a pre-defined member variable is in the buffer storing the type instance;

Step S3-2, converting the type of the content returned by the low layer interface into the JNI interface type according to the type of pre-defined member variable of the content returned by the low layer interface and the member variable type of the structure of the invoking part; and Step S3-3, sending the converted content to the type instance.

Preferably, the returning the returned result to the invoking part obtained in Step 106 comprises:

in case that the type of the content returned by the low layer interface is the pre-defined simple type, converting the parameter of the pre-defined simple type into the JNI interface type by a compulsory conversion according to the first preset mapping table, and then returning a value of the obtained JNI interface type to the invoking part; while in case that the type of the content returned by the low layer interface is a pre-defined complex type, converting the parameter of the pre-defined reference type into the JNI interface type according to the second preset mapping table, and then returning a value of the JNI interface type to the invoking part.

Preferably, in case that the type of the content returned by the low layer interface is a pre-defined complex type, converting the parameter of the pre-defined reference type into the JNI interface type according to the second mapping table, and then returning a value of the obtained JNI interface type to the invoking part, which comprises:

Step B1, obtaining a length of the content returned by the low layer interface, and allocating a third buffer according to the length;

Step B2, storing the content returned by the low layer interface into the third buffer;

Step B3, allocating a fourth buffer for the stored data in the JNI interface;

Step B4, storing the stored data into the fourth buffer.

The invention prevents source codes of a Java application from being obtained by decompiler and therefore improves security of accessing a smart key device by a java application.

DETAILED DESCRIPTION OF THE DRAWINGS

DETAILED EMBODIMENTS OF THE INVENTION

A clear and complete description will be given to the solution of the invention in conjunction with the drawings of the invention. Obviously, the described embodiments are just part of the embodiments, not the whole embodiments. All other embodiments made by those skilled in the art based on the embodiments of the invention, without involving an inventive step should be protected by the present invention.

Embodiment 1

Figure 1:
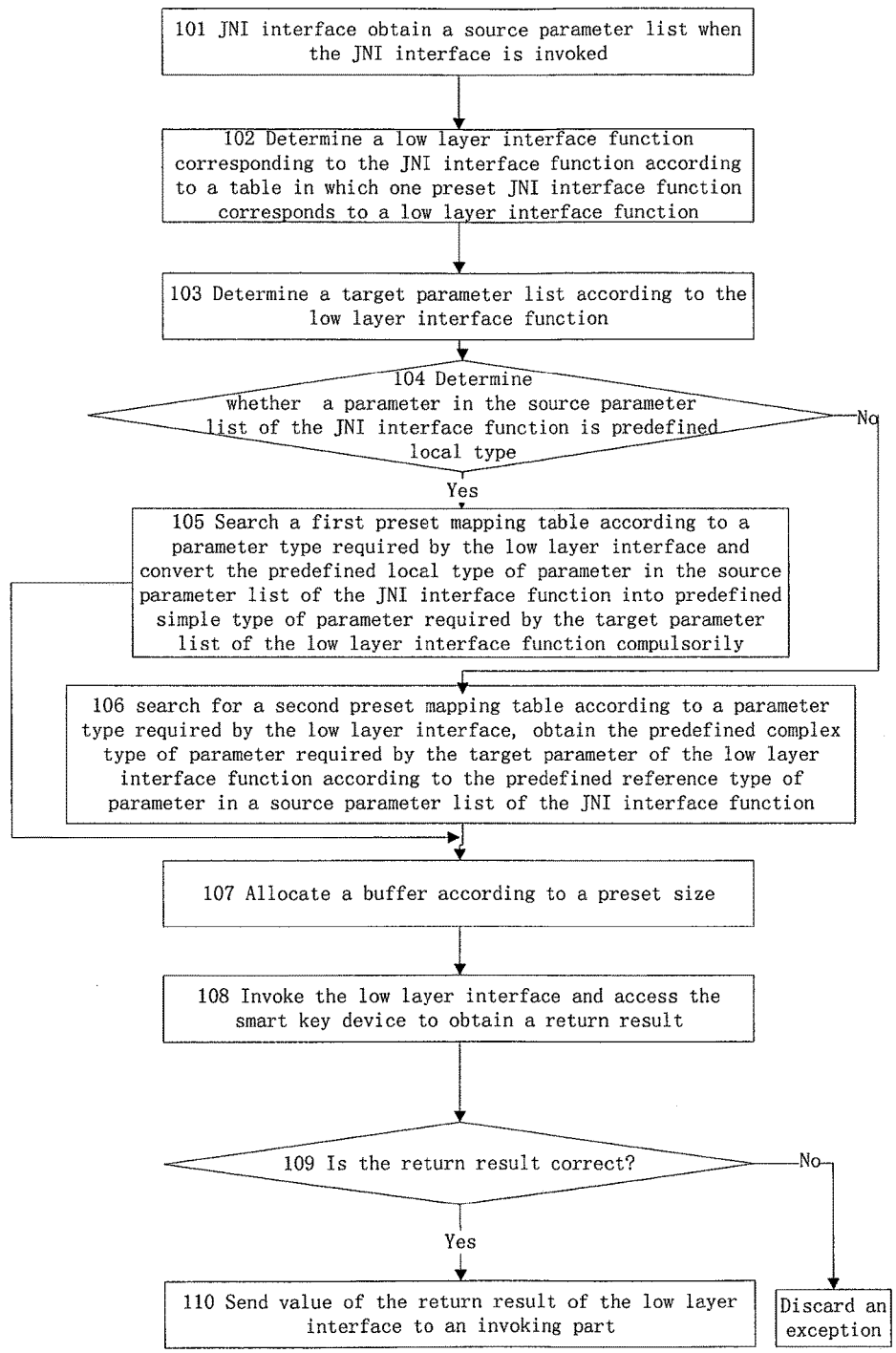
FIG. 1 is a flow chart of a method for accessing a smart key device by a java application according to Embodiment 1 of the invention.

A method for accessing a smart key device by a Java application is disclosed by Embodiment 1 of the invention, as illustrated in FIG. 1, including the following steps.

Step 101, a JNI (Java Native Interface) interface obtains a source parameter list at the time that a JNI interface function is invoked.

Step 102, a low layer interface function corresponding to the JNI interface function is determined according to a table in which one preset JNI interface function corresponds to one low layer interface function.

In the Embodiment 1, the low layer interface is a pre-defined PKCS#11 interface.

Step 103, determine a target parameter list according to the low layer interface function.

Step 104, determine whether a parameter in the source parameter list of the JNI interface function is a pre-defined local type, if yes, go to Step 105; if no, go to Step 106.

In the Embodiment 1, the predefined local type includes jbyte, jchar, jboolean, jint and jlong, etc.

Step 105, search a first preset mapping table according to parameter type required by the low layer interface, convert a predefined local type of parameter in the source parameter list of the JNI interface function into a predefined simple type of the parameter required by the target parameter list of the low layer interface function compulsorily, and go to Step 107.

The first preset mapping table is as below.

| Java type | JNI type | C/C++ type |
| --- | --- | --- |
| byte | jbyte | CK_BYTE |
| long | jlong | CK_ULONG |
| | | CK_SLOT_ID |
| | | CK_FLAGS |
| | | CK_SESSION_HANDLE |
| | | CK_OBJECT_HANDLE |

Step 106, search a second preset mapping table according to a parameter type required by the low layer interface, obtain a predefined complex type of the parameter required by the target parameter of the low layer interface function according to a predefined reference type of parameter in the source parameter list of the JNI interface function, and go to Step 107.

The second preset mapping table is as below.

| Java type | JNI type | C/C++ type |
|---|---|---|
| CK_NOTIFY | jobject | CK_TOKEN_INFO |
| Object | | CK_VOID |
| | | CK_NOTIFY |
| char[ ] | jcharArray | CK_UTF8CHAR[ ] |
| | | CK_ATTRIBUTE[ ] |
| | | CK_CHAR[ ] |
| byte[ ] | jbyteArray | CK_BYTE[ ] |
| public class CK_VERSION {<br>public byte major;<br>public byte minor;<br>}; | jobject | {CK_BYTE major;<br>CK_BYTE minor;}; |
| public class CK_ATTRIBUTE {<br>public long type;<br>public Object pValue;} | jclass | {CK_ATTRIBUTE_TYPE type,<br>CK_VOID_PTR pValue;<br>CK_ULONG ulValueLen;} |
| public interface CK_NOTIFY {<br>public void CK_NOTIFY(long hSession, long event, Object pApplication) throws PKCS11Exception;} | jobject | public void CK_NOTIFY(long hSession, long event, Object pApplication)throws PKCS11Exception |

Specifically Step 106 includes following steps.

Step 106-1, obtain length of the predefined reference type of the parameter in the source parameter list and allocate a buffer for the low layer interface according to the parameter length.

In the Embodiment 1, the parameter in the source parameter list is the predefined reference type while what is required by the low layer interface is a predefined complex type or a pointer type pointing to the predefined complex type, and due to different type and space, it is necessary to allocate a new space for the low layer interface function.

Step 106-2, divide the predefined reference type of data and determine whether type of the divided data is a type required by the low layer interface, if yes, go to Step 106-3; if no, discard an exception;

Step 106-3, detect the type of the divided data, if it is the predefined local type, go to Step 106-4; if it is the predefined reference type, go to Step 106-2.

Step 106-4, convert the divided predefined local type of data compulsorily.

Step 107, allocate a buffer according to a preset size.

Step 108, invoke the low layer interface and access the smart key device so as to obtain a returned result.

Step 109, determine whether the returned result is correct, if yes, go to Step 110; if no, discard an exception, and end the process.

Specifically, determine whether the result value is identical to CKR_OK (a low layer macro definition), if yes, determine that the returned value is correct; if no, determine that the returned value is not correct.

Discarding an exception includes the following steps.

Step a, obtain an exception type object.

Step b, instantiate the exceptional type object.

Step c, discard the instantiated exceptional type object.

Step 110, send a value of the returned result of the low layer interface to an invoking part.

Specifically, 1. if the data type of the obtained target parameter by converting the parameter in the source parameter list compulsorily is the predefined simple type, perform compulsory data type conversion on the target parameter according to the first preset mapping table and upload it; and 2. if the data type of the obtained target parameter by converting the parameter in the source parameter list compulsorily is the predefined complex type, perform data type conversion on the target parameter according to the second preset mapping table and upload it, which includes below steps.

Step S1, divide the predefined complex type of parameter and detect the type of the divided parameter, if type of the divided parameter is the predefined simple type, go to Step S2, if type of the divided parameter is the predefined complex type, go to Step S1;

Step S2, perform compulsory conversion on the predefined local type of data after dividing and uploading the converted result; and Step S3, return the converted result to the invoking part.

Embodiment 2

Figure 2:
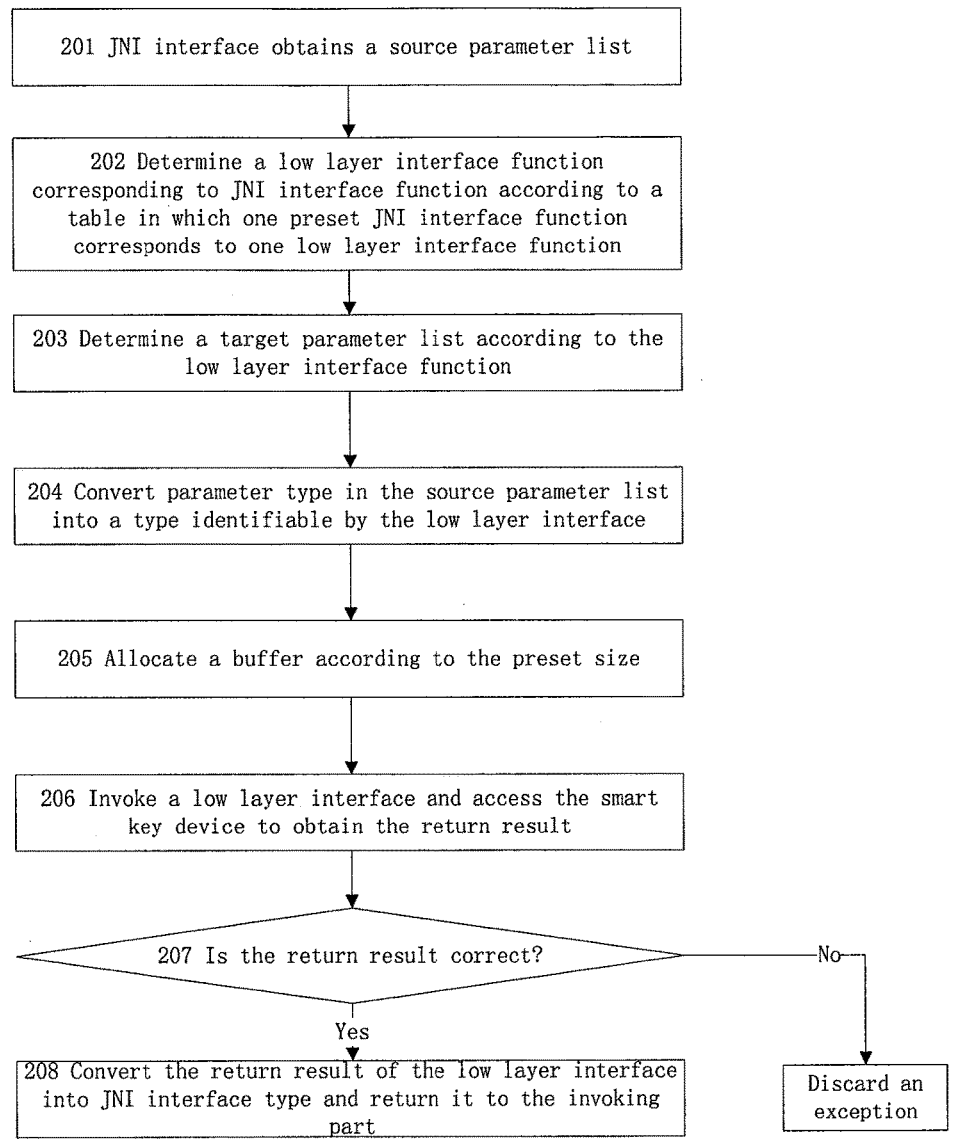
FIG. 2 is a flow chart of a method for accessing a smart key device by a java application according to Embodiment 2 of the invention.
Figure 3:
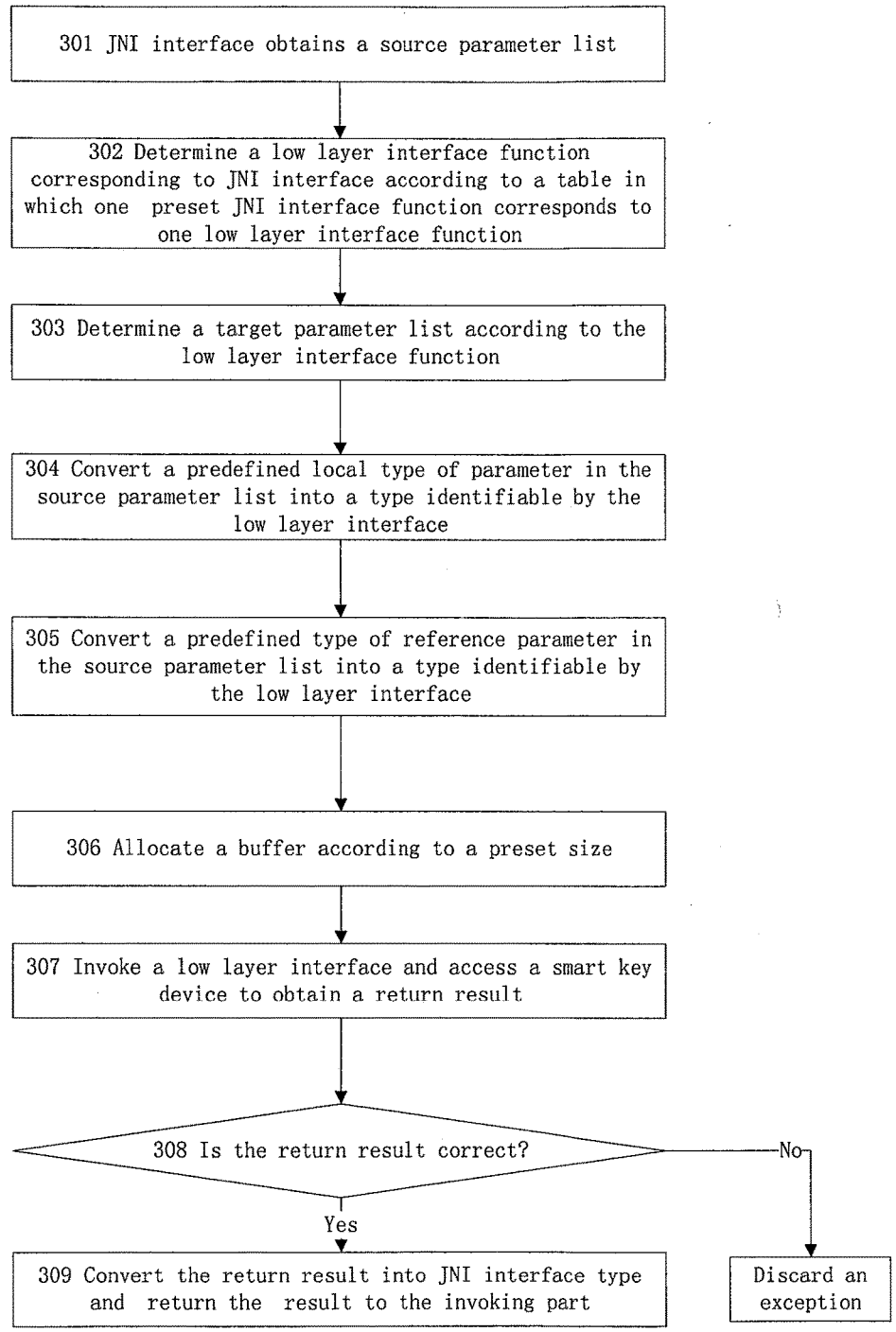
FIG. 3 is a flow chart of a method for accessing a smart key device by a java application according to Embodiment 3 of the invention.
Figure 4:
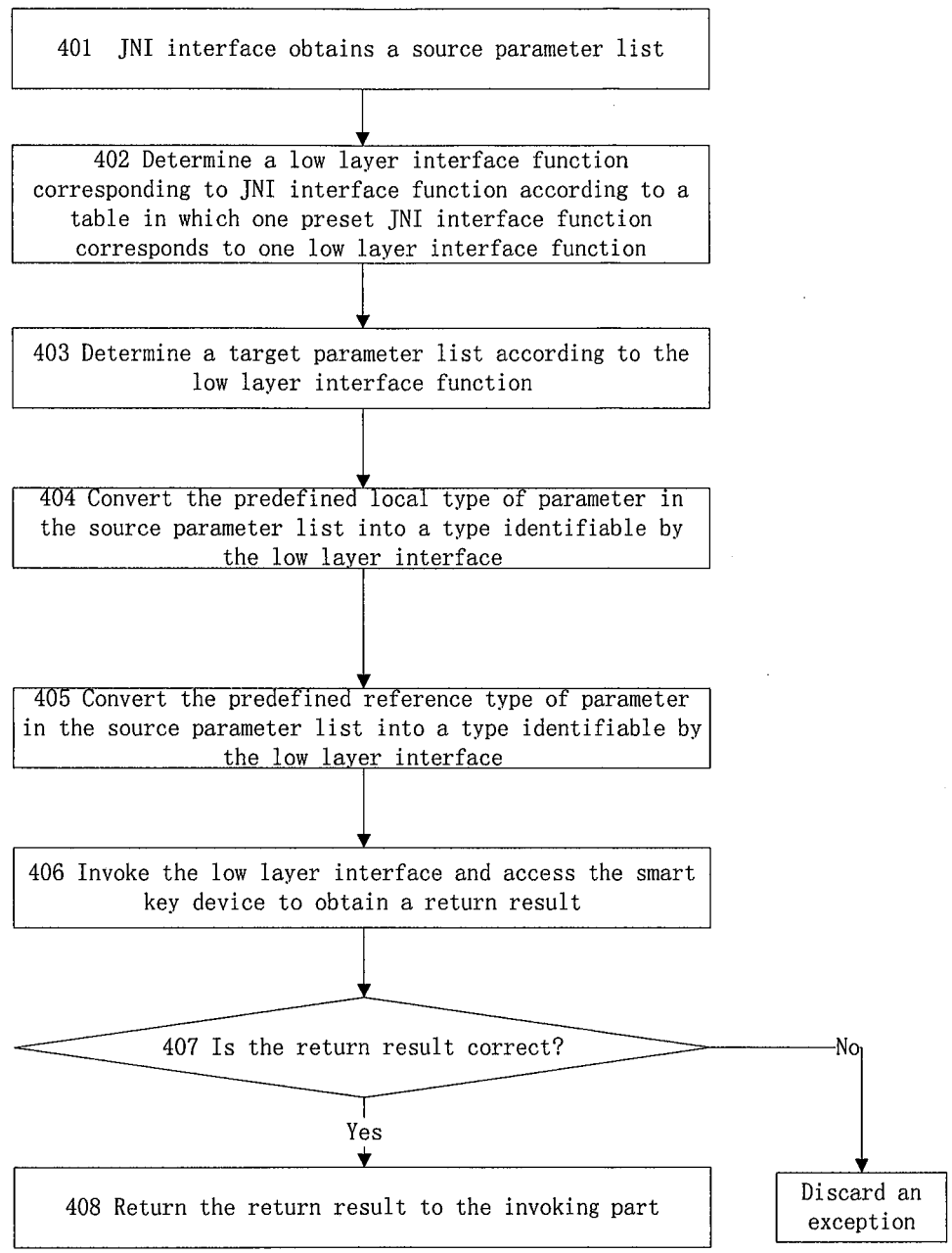
FIG. 4 is a flow chart of method for accessing a smart key device by a java application according to Embodiment 4 of the invention.
Figure 5:
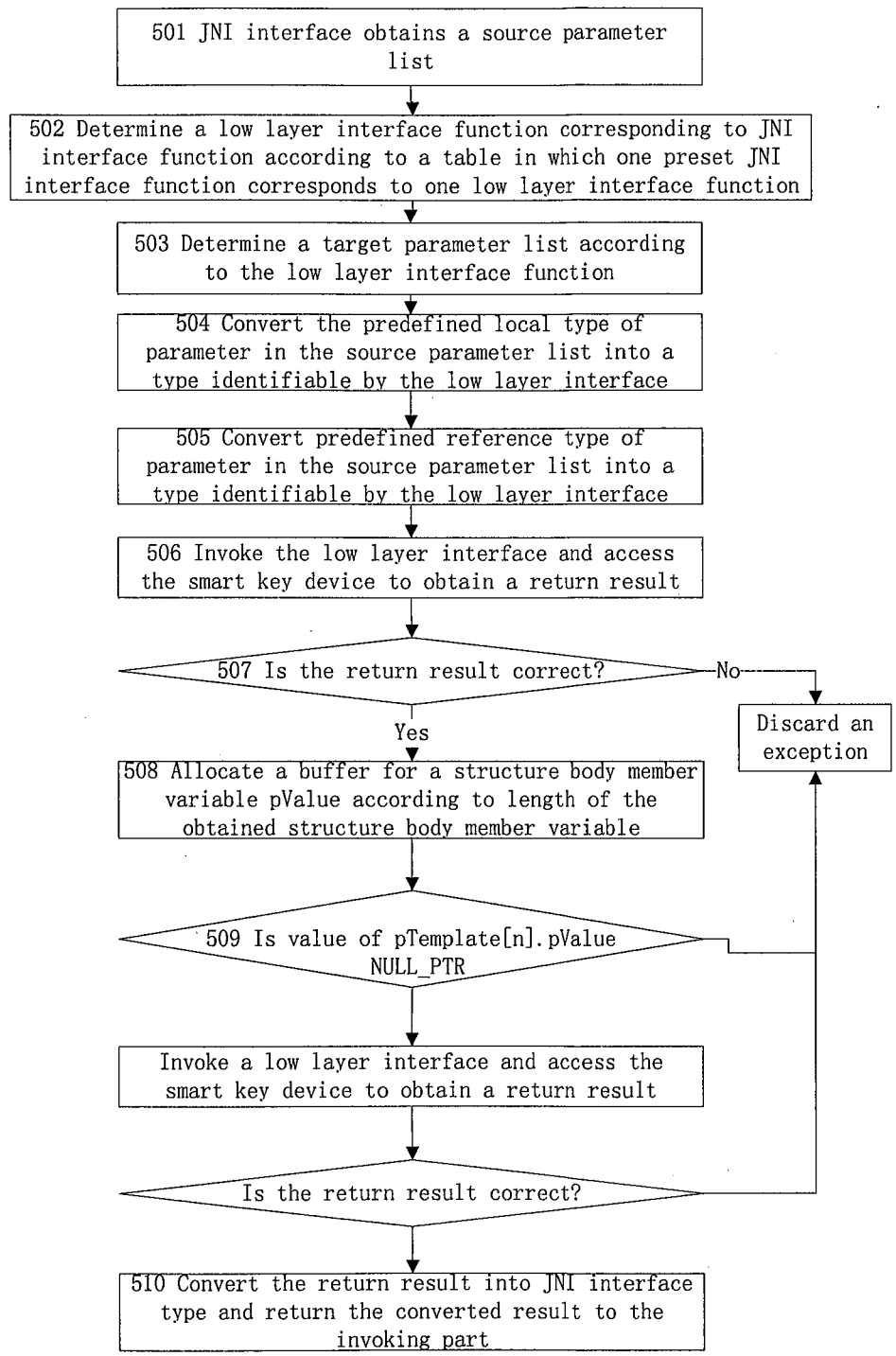
FIG. 5 is a flow chart of method for accessing a smart key device by a java application according to Embodiment 5 of the invention.
Figure 6:
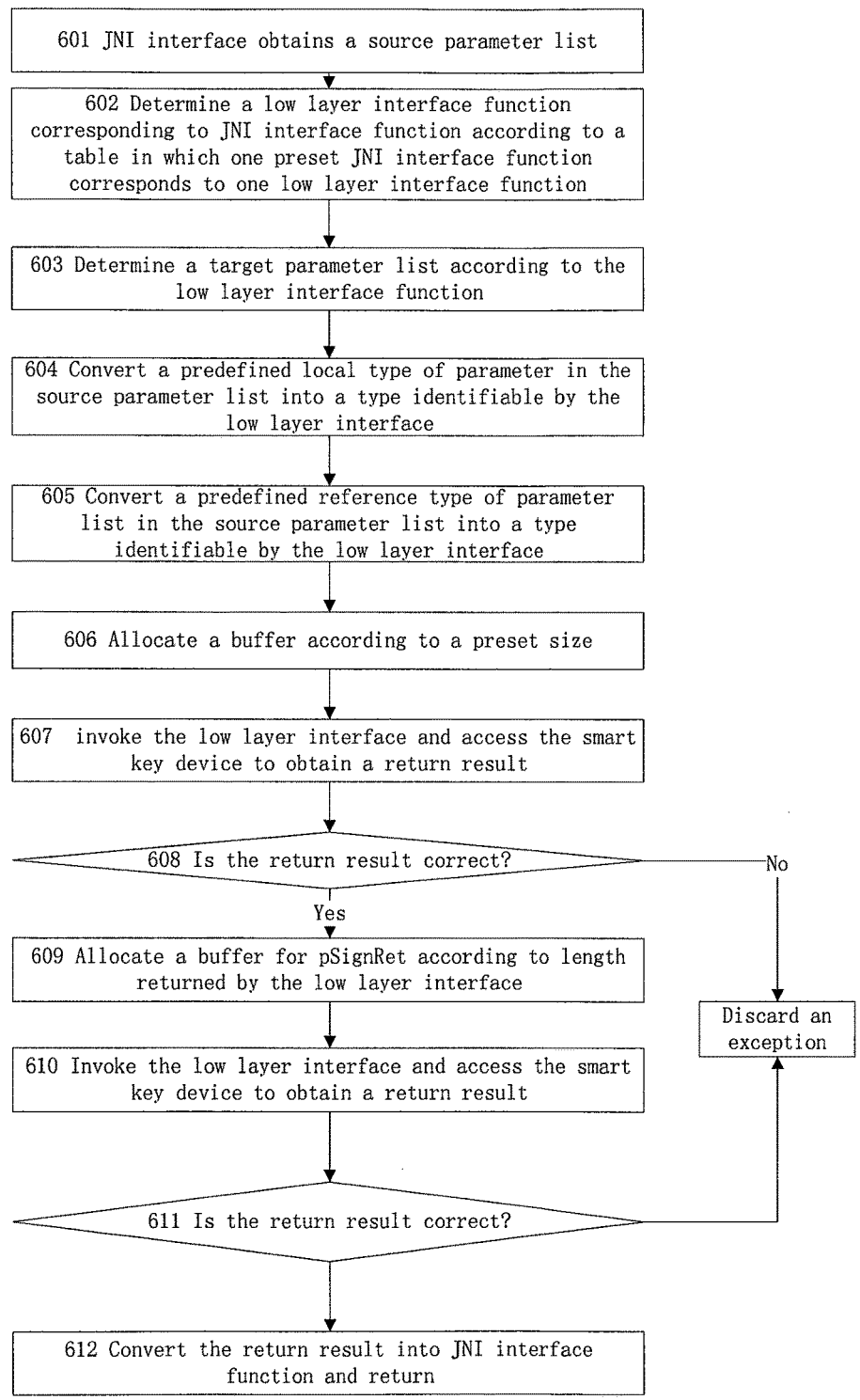
FIG. 6 is a flow chart of method for accessing a smart key device by a java application according to Embodiment 6 of the invention.

A method for accessing a smart key device by a java application is provided in Embodiment 2 of the present invention, as illustrated in FIG. 2, including the following steps.

In the embodiment 2, a method for obtaining information of a smart key device is taken as an example.

In case that public native CK_TOKEN_INFO C_GetTokenInfo (long slotID) throws PKCS11Exception, a preset interface, is invoked, the following steps are executed.

Step 201, the JNI interface obtains a source parameter list.

Specifically, in case that the preset interface public native CK_TOKEN_INFO C_GetTokenInfo (long slotID) throws PKCS11Exception is invoked, invoking a JNI interface function JNIEXPORT jobject JNICALL Java_pkcs11_wrapper_PKCS11Implementation_C_1GetTokenInfo(JNIEnv*env, jobject obj, jlong jSlotID) by java:with JNI technology, in which pkcs11_wrapper_PKCS11Implementation in the interface name is a path of the preset interface in the invoking part project. The preset interface is in type PKCS11Implementation of packet name pkcs11.wrapper of the invoking part.

The obtained parameter list is JNIEnv *env, jobject obj, jlong jSlotID, in which JNIEnv *env, jobject obj refers to a parameter added by the JNI interface function for operating java data in JNI layer or for creating a java data object and assigning a value for the java data. The real source parameter list is jlong jSlotID.

Step 202, determine a low layer interface function corresponding to the JINI interface function according to a table in which one preset JNI interface function corresponds to one low layer interface function.

Specifically, the invoked low layer interface is a preset PKCS#11 interface; and In the Embodiment 2, the low layer interface function corresponding to the JNI interface function is as below.

```
C_GetTokenInfo(
    CK_SLOT_ID slotID,
    CK_TOKEN_INFO_PTR pTokenInfo);
```

Step 203, determine a target parameter list according to the low layer interface function.

In the Embodiment 2, the target parameter list is CK_SLOT_ID slotID, CK_TOKEN_INFO_PTR pTokenInfo.

Step 204, convert the parameter type in the source parameter list into a type identifiable by the low layer interface.

Specifically, convert the jlong type of jSlotID into CK_SLOT_ID type of slotID according to the first preset mapping table.

Step 205, allocate a buffer according to a preset size.

Specifically, allocate the buffer according to size of CK_TOKEN_INFO of a preset PKCS#11 data structure.

CK_TOKEN_INFO tokenInfo={0};

Where, the target parameterpTokenInfo is first address of the buffer, for example, pTokenInfo=&tokenInfo.

The structure of the buffer is as below.

```
{CK_UTF8CHAR   label[32];
 CK_UTF8CHAR   manufacturerID[32];
 CK_UTF8CHAR   model[16];
 CK_CHAR       serialNumber[16];
 CK_FLAGS      flags;
 CK_ULONG      ulMaxSessionCount;
 CK_ULONG      ulSessionCount;
 CK_ULONG      ulMaxRwSessionCount;
 CK_ULONG      ulRwSessionCount;
 CK_ULONG      ulMaxPinLen;
 CK_ULONG      ulMinPinLen;
 CK_ULONG      ulTotalPublicMemory;
 CK_ULONG      ulFreePublicMemory;
 CK_ULONG      ulTotalPrivateMemory;
 CK_ULONG      ulFreePrivateMemory;
 CK_VERSION    hardwareVersion;
 CK_VERSION    firmwareVersion;
 CK_CHAR       utcTime[16];};
```

The structure of the invoking part is as below.

```
public class CK_TOKEN_INFO
{public char[ ] label;
 public char[ ] manufacturerID;
 public char[ ] model;
 public char[ ] serialNumber;
 public long flags;
 public long ulMaxSessionCount;
 public long ulSessionCount;
 public long ulMaxRwSessionCount;
 public long ulRwSessionCount;
 public long ulMaxPinLen;
 public long ulMinPinLen;
 public long ulTotalPublicMemory;
 public long ulFreePublicMemory;
 public long ulTotalPrivateMemory;
 public long ulFreePrivateMemory;
 public CK_VERSION   hardwareVersion;
 public CK_VERSION   firmwareVersion;
 public char[ ] utcTime;};
```

Step 206, invoke a low layer interface and access the smart key device to obtain a returned result.

Specifically, send CK_SLOT_ID type of slotID in Step 204 and the first address of the buffer in Step 205 to the low layer interface by invoking CK_RV rv=C_GetTokenInfo (slotID, pTokenInfo).

Step 207, determine whether the returned result is correct, if yes, go to Step 208; if no, discard an exception and end the process.

Specifically, if the returned value of the low layer interface is not a preset Success, return the returned value of the low layer interface to the invoking part by discarding an exception; if the returned value of the low layer interface is a preset Success, return the returned value of the low layer interface and content in the buffer to the invoking part.

The discarding an exception includes the following steps.

Step S1, obtain an exception type of the invoking part according to the parameter JNIEnv *env in the source parameter list.

For example, the exception type is PKCS11Exception, and the obtaining includes obtaining the exception type of the invoking part by invoking jclass errClass=(*env)→FindClass(env, "pkcs11/wrapper/PKCS11Exception"), in which the "pkcs11/wrapper/PKCS11Exception" is a path of the exception type PKCS11Exception in the invoking part structure.

Step S2, instantiate the invoking part exception by invoking the parameterJNIEnv *env in the source parameter list.

Specifically, a constructure function of the preset exception type is obtained by invoking jmethodID jConstructor= (*env)→GetMethodID(env, errClass, "<init>", "( )V"), in which "<init>" refers to the constructure function; "( )V" refers to the parameter and type of a returned value anderrClass is obtained in Step S1.

The invoking part exception part type is instantiated by invoking jthrowable jOutOfError=(jthrowable)(*env)→NewObject (env, errClass, jConstructor), in which errClass is obtained in Step S1 and jConstructoris is obtained by invoking GetMethodID.

Step S3, discard the exception for the invoking part by invoking parameter JNIEnv *env in the source parameter list.

Specifically, the exception is discarded by invoking (*env)→Throw(env, jOutOfError) and received by the invoking part, in which jOutOfError is obtained in Step S2.

Step 208, convert the returned result of the low layer interface into a JNI interface type and send the JNI interface type to the invoking part, which includes the following steps.

Step 208-1, obtain CK_TOKEN_INFO type of the invoking part by invoking JNIENV *env in the JNI parameter list.

Specifically, CK_TOKEN_INFO type of the invoking part is obtained by invoking jclass jTokenInfoClass= (*env)→FindClass (env,"pkcs11/wrapper/CK_TOKEN_INFO"), in which "pkcs11/wrapper/CK_TOKEN_INFO" is a path of the preset CK_TOKEN_INFO type is in the invoking part project.

Step 208-2, create an instance for CK_TOKEN_INFO type by invoking JNIENV *env in the JNI parameter list.

Specifically, the instance for CK_TOKEN_INFO type is created by invoking jobject jTokenInfoObject=(*env)→AllocObject (env, jTokenInfoClass).

Step 208-3, send the content returned by the low layer interface to the instance for the type by invoking JNIENV *env in the JNI parameter list.

Step 208-3 includes following steps.

Firstly, obtain a feature number of a preset member variable in the instance corresponding to the type.

Specifically the feature number of the preset member variable is obtained by invoking jfieldID jFieldID1=(*env)→GetFieldID(env, jTokenInfoClass, "label", "[C");

jfieldID jFieldID2=(*env)→GetFieldID(env, jTokenInfoClass, "flags", "J");

jfieldID jFieldID3=(*env)→GetFieldID(env, jTokenInfoClass,"hardwareVersion","Lpkcs11/wrapper/CK_VERSION;"); in which, label refers to the preset member variable name, [C refers to the type char[ ] of the preset member variable; J refers to the type long; pkcs11/wrapper/CK_VERSION refers to a path of the preset CK_VERSION type in the invoking part project.

Secondly, convert the content returned by the low layer interface into corresponding type according to type of the member variable in the preset structure of the content returned by the low layer interface, and the type of the member variable of the invoking part structure.

Specifically, the conversion includes the following two steps.

1. convertCK_ULONG and CK_FLAGS into jlong compulsorily according to the first preset mapping table.

2. ConvertCK_UTF8CHAR[ ] and CK_CHAR[ ] into jcharArray according to the second preset mapping table, which includes (1) converting CK_UTF8CHAR[ ], CK_CHAR[ ] into jchar* type, converting CK_UTF8CHAR[ ], CK_CHAR[ ]repeatedly into jchar* by invoking jchar* jpTemp=(jchar*)malloc(sizeof(tokenInfo.label)*sizeof(jchar)) and for (int i=0; i<sizeof (tokenInfo.label); i++) {jpTemp[i]=(jchar)tokenInfo.label[i];}, and (2) converting the jchar* type of data into jcharArray type of data by a parameterJNIEnv *env in the source parameter list.

Specially, the converting the jchar* type of data into jcharArray type of data by a parameter JNIEnv *env in the source parameter list includes allocating a buffer for jcharArray by invoking jcharArray jArray=(*env)→NewCharArray(env, jsize(sizeof(tokenInfo.label)*sizeof(jchar))); and storing content in tokenInfo.label of jchar* into the buffer of jArray by invoking (*env)→SetCharArrayRegion(env, jArray, 0, jsize(sizeof(tokenInfo.label)), jpTemp).

3. convert the structure body CK_VERSIONof the low layer interface into CK_VERSION type of the invoking part according to the second preset mapping table.

Specifically, the third step includes following content.

Structure of CK_VERSIONin the content returned by the low layer interface is as below.

{CK_BYTE major;
CK_BYTE minor;};

Structure of CK_VERSIONin the invoking part is as below.

public class CK_VERSION {
public byte major;
public byte minor;}.

The conversion includes following steps.

(1) obtain the CK_VERSION type of the invoking part by invoking JNIEnv *env in the JNI parameter list, for example, by invoking jclass j VersionClass=(*env)→FindClass(env, pkcs11/wrapper/CK_VERSION), in which pkcs11/wrapper/CK_VERSION is a path of the preset CK_VERSION type in the invoking part project.

(2) create a CK_TOKEN_INFO type object by invoking JNIEnv *env in the JNI parameter list, for example, by invoking jobject jVersionObject= (*env)→AllocObject (env, jVersionClass).

(3) send the content of the CK_VERSION object returned by the low layer interface to instance of the CK_VERSION type by invoking JNIEnv *env in the JNI parameter list.

The step includes the following steps.

i) obtain a feature number of the obtained preset member variable in the instance of the type by invoking jfieldID jFieldID=(*env)→GetFieldID(env, jVersionClass, "major", "B").

ii) convert the content CK_BYTE returned by the low layer interface into corresponding jbyte type according to type of the member variable in the preset structure of the content returned by the low layer interface and type of the member variable of the structure of the invoking part, which specifically includes converting CK_BYTE type into jbyte type compulsorily according to the first mapping table.

iii) by invoking (*env)→SetByteField(env, jVersionObject, jFieldID, (jbyte)(tokenInfo.hardwareVersion.major)), send the converted content to the instance jVersionObject Thirdly, sending the converted content to jTokenInfoObject by invoking (*env)→SetObjectField(env, jTokenInfoObject, jFieldID1, jArray), (*env)→SetLongField (env, jTokenInfoObject, jFieldID2, (jlong)tokenInfo.flags), and (*env)→SetObjectField(env, jTokenInfoObject, jFieldID3, jVersionObject).

Step 208-4, return the created instance jTokenInfoObject corresponding to the type by invoking return method.

Embodiment 3

A method for accessing a smart key device by a java application is provided in embodiment 3, including following steps.

The embodiment 3 takes a method for obtaining an accessing identification as an example.

In case that the preset interface public native long C_OpenSession(long slotID, long flags, Object pApplication, CK_NOTIFY Notify) throws PKCS11Exception, following steps are executed.

Step 301, the JNI interface obtains a source parameter list. Specifically, in case that the preset interface public native long C_OpenSession(long slotID, long flags, Object pApplication, CK_NOTIFY Notify) throws PKCS11Exception is invoked, the java invokes the JNI interface function JNIEXPORT jlong JNICALL Java_pkcs11_wrapper_PKCS11Implementation_C_1OpenSession (JNIEnv *env, jobject obj, jlong jSlotID, jlong jFlags, jobject jApplication, jobject jNotify) with JNI technology, in which pkcs11_wrapper_PKCS11Implementation in the interface name is a path of the preset interface in the invoking part project. The preset interface is in type PKCS11Implementation of packet name pkcs11.wrapper of the invoking part.

JNIEnv *env, jobject obj in the parameter lsit is a parameter added by JNI for operating java data or for creating java data object and assigning a value for the java data. The real parameter list is jlong jSlotID, jlong jFlags, jobject jApplication, jobject jNotify.

Step 302, determine a low layer interface function corresponding to the JNI interface function according to a table, in which one preset JNI interface function corresponds to one low layer interface function.

Specifically the low layer interface function corresponding to the JNI interface function is

```
CK_RV C_OpenSession(
    CK_SLOT_ID slotID,
    CK_FLAGS flags,
    CK_VOID_PTR pApplication,
    CK_NOTIFY Notify,
    CK_SESSION_HANDLE_PTR phSession );
```

Step 303, determine a target parameter list according to the low layer interface function.

Specifically, the target parameter list isCK_SLOT_ID slotID, CK_FLAGS flags, CK_VOID_PTRpApplication, CK_NOTIFY Notify, CK_SESSION_HANDLE_PTR phSession.

Step 304, convert the predefined local type of parameter in the source parameter list into a type identifiable by the low layer interface.

Specifically, Step 304 includes converting jlong type of jSlotID into CK_SLOT_ID type of slotID compulsorily according to the first preset mapping table, and converting jlong type of jFlags into CK_FLAGS type of flagscompulsorily.

Step 305, convert the predefined reference type of parameter in the source parameter list into a type identifiable by the low layer interface.

Step 305 includes the following steps.

Convert jobject type of jApplication into CK_VOID_PTR type of pApplication and convert jobject type of jNotify into Notify of CK_NOTIFYtype according to the second mapping table.

According to function of the parameter of the low layer interface, because CK_NOTIFY is a function pointer in the low layer interface, while the structure of it in the invoking part is a type, the parameter jApplication is used for application by function pointer of CK_NOTIFY.

According to a principle of the low layer interface unable to use an invoking part function directly, two parameters of jobject should be converted into CK_VOID_PTR type, a function in JNI layer is converted into a function pointer of CK_NOTIFY and the function can use the invoking part function. Structure of the converted jobject is as below.

typedef struct NotifyEncapsulation{
    jobject jNotifyObject;
    jobject jApplicationData;
}NotifyEncapsulation;

Where, the member jNotifyObject refers to jNotify in the parameter list and member jApplicationData refers to jApplication in the parameter list.

Allocate a buffer according to a preset size.

Specifically, allocate a buffer according to size of the preset data structure NotifyEncapsulation, in which NotifyEncapsulation application={NULL, NULL}.

Where, the target parameter pApplication refers to a first address of the buffer. pApplication=&application.

Store jNotify and jApplication in the source parameter in the buffer by invoking application.jNotifyObject=jNotify; application.jApplicationData=jApplication.

Constructing a target parameter CK_NOTIFY type of Notify includes the following steps.

Structure of the jNotify in the invoking part is as below.

```
public interface CK_NOTIFY {
    public void CK_NOTIFY(long hSession, long event,
    Object pApplication) throws PKCS11Exception;}.
```

Where, the invoking function to be really invokes is a member function public void CK_NOTIFY(long hSession, long event, Object pApplication) throws PKCS11Exception in CK_NOTIFY type.

Where, the JNI layer function parameter list is provided by the low layer interface, in which CK_VOID_PTR pApplication is the parameter pApplication of CK_VOID_PTR of the low layer interface, that is the first address of the above variable application.

Specifically, the JNI function notify Callback applies the invoking part function includes the following steps.

```
CK_RV notifyCallback(
    CK_SESSION_HANDLE hSession,
    CK_NOTIFICATION  event,
    CK_VOID_PTR      pApplication).
```

The first address of the function interface notify Callback is value of the target parameter Notify, for example, Notify=(CK_NOTIFY)¬ifyCallback.

Convert the CK_SESSION_HANDLE type of hSessionin the parameter list into jlong type of hSession compulsorily, convert CK_NOTIFICATION type of event into jlong type of event compulsorily and convert the member jApplicationData in the application into jobject type.

The JNI applies the invoking part function includes the following steps.

Firstly, obtain JNIEnv pointer type of env by the following formular.

```
javaVM *jvm;
jsize actualNumberVMs;
JNIEnv *env;
jint returnValue = JNI_GetCreatedJavaVMs(&jvm, (jsize) 1,
    &actualNumberVMs);
returnValue = (*jvm)->GetEnv(jvm, (void **) &env,
    JNI_VERSION_1_2);
```

Secondly, obtain the invoking part CK_NOTIFY type by invoking jclass ckNotifyClass=(*env)→FindClass(env, pkcs11/wrapper/PKCS11Implementation), in which PKCS11Implementation is a path of the CK_NOTIFY type in the invoking part project.

Thirdly, obtain a feature number of the member function public void CK_NOTIFY(long hSession, long event, Object pApplication)throws PKCS11Exception in the invoking part CK_NOTIFY type by invoking jmethodID jmethod=(*env)→etMethodID(env, ckNotifyClass, "CK_NOTIFY", "(JJLjava/lang Object;)V").

Fourthly, invoke the function CK_NOTIFY in the CK_NOTIFY type by invoking (*env)→CallVoidMethod (env, notify ncapsulation→jNotifyObject, jmethod,jSessionHandle, jEvent, notifyEncapsulation→jApplicationData).

Step 306, allocate a buffer according to a preset size, for example, allocate a buffer according to size of the preset PKCS#11 data type CK_SESSION_HANDLE.
CK_SESSION_HANDLE hSession=0;
phSession=&hSession,
in which phSession is first address of the buffer.

Step 307, invoke the low layer interface and access the smart key device to obtain a returned result.

Specifically, the step includes sending parameter converted in Step 304 and Step 305 and a first address of the buffer in Step 306 to the low layer interface by invoking CK_RV rv=C_OpenSession(CK_SLOT_ID slotID, CK_FLAGS flags, CK_VOID_PTR pApplication, CK_NOTIFY Notify, phSession).

Step 308, determine whether the returned result is correct, if yes, go to Step 309; if no, discard an exception and end the process.

Specifically, if the returned value of the low layer interface is not a preset Success, return the returned value of the low layer interface by discarding an exception; if the returned value of the low layer interface is a preset Success, return the returned value of the low layer in Step 309 and content in the buffer to the invoking part.

Specifically, the discarding an exception includes the following steps. Step S1, obtain an invoking part exception type by invoking JNIEnv *env in the JNI parameter list.

If the invoking part exception type is PKCS11Exceptionexception, obtain the invoking part exception type by invoking jclass errClass=(*env)→FindClass(env, "pkcs11/wrapper/PKCS11Exception"), in which "pkcs11/wrapper/PKCS11Exception" is a path of the PKCS11Exceptionexception type in the invoking part project.

Step S2, instantiate the invoking part exception type by invoking JNIEnv *env in JNI parameter list.

Specifically, Step S2 includes obtaining preset exception type of constructure function by invoking jmethodID jConstructor=(*env)→GetMethodID(env, errClass, "<init>", "( )V"), in which "<init>" refers to the constructure function, "( )V" refers to parameter, type of the returned value and errClass is obtained in Step S1; and initiating the invoking part exception type by invoking jthrowable jOutOfError=(jthrowable)(*env)→NewObject(env, errClass, jConstructor)

The errClass is obtained in Step S1 and jConstructor is obtained by invoking GetMethodID.

Step S3, discard an exception for the invoking part by invoking JNIEnv *env in the JNI parameter list.

The exception is discarded by invoking (*env)→Throw (env, jOutOfError) and received by the invoking part. jOutOfError is obtained in Step S2.

Step 309, convert the returned result into JNI interface type and return the result to the invoking part.

Returning content of the buffer to the invoking part includes that the structure of the buffer is

```
{
CK_ULONG;
}, and
a result of the invoking part is
{
long;
}.
```

Convert CK_SESSION_HANDLE type of hSession into jlong type of jsession handle compulsorily according to the first preset mapping table and return jlong type of jsessionhandle by invoking return method.

Embodiment 4

A method for accessing a smart key device by a java application is provided by Embodiment 4 of the invention, including following steps.

In the embodiment 4, the method is described by setting a searching condition. In case that a preset interface public native void C_FindObjectsInit(long hSession, CK_ATTRIBUTE[ ] pTemplate) throws PKCS11Exception is invoked, following steps are executed.

Step 401, the JNI interface obtains a source parameter list.

Specifically, in case that a preset interface public native void C_FindObjectsInit(long hSession, CK_ATTRIBUTE[ ] pTemplate) throws PKCS11Exception is invoked, the java invokes a JNI interface JNIEXPORT void JNICALLJava_pkcs11_wrapper_PKCS11Implementation_C_1FindObjects Init(JNIEnv *env, jobject obj, jlong jSessionHandle, jobjectArray jTemplate) with JNI technology, in which pkcs11_wrapper_PKCS11Implementation in the interface name refers to a path of the preset interface in an invoking part project, which represents that the preset interface is in the instance PKCS11Implementation with packet name pkcs11.wrapper of the invoking part.

The parameter list is JNIEnv *env, jobject obj, jlong jSessionHandle, jobjectArray jTemplate, in which JNIEnv *env and jobject obj is a parameter added by JNI for operating java data in JNI layer or for creating a java data object and assigning a value to the java data object. The real source parameter list is jlong jSessionHandle, jobjectArray jTemplate.

Step 402, determine a low layer interface function corresponding to the JNI interface function according to a table in which one preset JNI interface corresponds to one low layer interface function.

In the embodiment 4, the low layer interface function is

---

CK_RV C_FindObjectsInit(
CK_SESSION_HANDLE hSession,
CK_ATTRIBUTE_PTR pTemplate,
CK_ULONG ulCount).

---

Step 403, determine a target parameter list according to the low layer interface function.

In the embodiment 4, the target parameter list is CK_SESSION_HANDLE hSession, CK_ATTRIBUTE_PTR pTemplate, CK_ULONG ulCount.

Step 404, convert a predefined local type of parameter in a source parameter list into a type identifiable by the low layer interface.

Specifically, the step includes converting jlong type of jSessionHandle into CK_SESSION_HANDLE type of hSession compulsorily.

Step 405, convert the predefined reference type of parameter in the source parameter list into a type identifiable by the low layer interface.

Specifically, the step includes converting jobjectArray type of jTemplate into CK_ATTRIBUTE_PTR type of pTemplate and converting length of the parameter jTemplate into CK_ULONG ulCount according to a second preset mapping table.

The step further includes the following steps.

Step A, allocate a buffer for the converted parameter "template" according to length of the parameter jTemplate so as to use for the low layer interface, which specifically includes obtaining parameter length by invoking CK_ULONG ulCount=(*env)→GetArrayLength(env, jTemplate) and allocating buffers for the parameter "pTemplate" by invoking CK_ATTRIBUTE_PTR pTemplate=(CK_ATTRIBUTE_PTR) malloc(ulCount*sizeof(CK_ATTRIBUTE)), and providing a buffer for the converted parameter again so as to use for the low layer interface because the type of the parameter jTemplate is not identifiable by the low layer interface.

Step B, obtain each structure body in the array jTemplate of CK_ATTRIBUTE.

Structure of CK_ATTRIBUTE in the low layer interface is as below.

```
{
CK_ATTRIBUTE_TYPE type,
CK_VOID_PTR pValue;
CK_ULONG ulValueLen;}.
```

The structure of CK_ATTRIBUTE in the invoking part is as below.

```
public class CK_ATTRIBUTE {
public long type;
public Object pValue;}
```

In the embodiment 4, the structure body is obtained by invoking jobject jTemplate=(*env)→GetObjectArray Element(env, jArray, n), in which value of n is larger than 0 and smaller than ulCount, represents the arraysubscript. The buffer corresponding to jTemplate is pTemplate[n].

Step C, convert data types of member variables in each obtained structure body into data types identifiable by the low layer interface.

Specifically, Step C includes the following steps.

Step C-1, obtain structure of the member variable in the invoking part;

In the embodiment 4, obtain structure of the member variable in the invoking part by invoking jclass jAttributeClass=(*env)→GetObjectClass (env, jAttribute).

Step C-2, obtain a feature number of the member variable in an instance corresponding to the type;

In the embodiment 4, obtain the feature number by invoking
jfieldID jFieldID1=(*env)→GetFieldID(env, jAttributeClass, "type", "J");
jfieldID jFieldID2=(*env)→Get FieldID(env, jAttributeClass,"pValue","Ljava/lang/Object;").

Step C-3, obtain a value of the member variable by invoking
jobject jPValue=(*env)→Get ObjectField (env, jAttribute, jFieldID2), and
jlong jType=(*env)→GetLongField(env, jAttribute, jFieldID1).

Step C-4, convert the data type of JNI interface of the obtained member variable value into a type identifiable by the low layer interface.

In the embodiment 4, Step C-4 includes
converting the member variable compulsorily according to the first preset mapping table by invoking pTemplate[n].type=(CK_ATTRIBUTE_TYPE)jType and obtain type, and
converting jobject type of jPValue into pValue of CK_VOID_PTR type and ulValueLenof CK_ULONG type according to a second preset mapping table.

Step A, if pTemplate[n].type is a type except for CKA_WRAP_TEMPLATE or CKA_UNWRAP_TEMPLATE, the conversion includes following steps.

Specifically, it is known from the preset mapping table that possible types of jPValue are pkcs11/wrapper/CK_DATE, java/lang/Boolean, java/lang/Byte, java/lang/Character, java/lang/Class, java/lang/Integer, java/lang/Long, java/lang/String, java/lang/StringBuffer, [Z, [B, [C, [I, [J and java/lang/Object.

Step A-1, obtain a structure of the possible type in the invoking part, specifically for example, java/lang/String, obtain structure of type by invoking j class jStringClass=(*env)→FindClass(env,"java/lang/String").

Step A-2, compare type of jPValue with structure obtained by Step A-1.

Specifically, for java/lang/String, Step A-2 includes comparing type of jPValue with type of jStringClass by invoking (*env)→IsInstanceOf(env, jPValue, jStringClass), if they are identical, return Success; if they are not identical, return Failure.

Step A-3, convert jPValue into PValue of CK_VOID_PTR type and UlValueLen of CK_ULONG type.

Step A-3 includes following steps.

Step A-31, if type of jPValue is java/lang/Boolean, the UlValueLen of CK_ULONG type is obtained by invoking pTemplate[n]. ulValueLen=sizeof(CK_BBOOL).

Step A-31 includes following steps.

Step a, allocate a buffer for pTemplate[n].pValue specifically by invoking pTemplate[n].pValue=(CK_BBOOL*) malloc(sizeof(CK_BBOOL)).

Step b, obtain structure of java/lang/Boolean specifically by invoking jclass jBooleanClass=(*env)→FindClass(env, "java/lang/Boolean").

Step c, convert jPValue into jboolean type of jValue.

Specifically, by invoking jmethodID jValueMethod=(*env)→GetMethodID(env, jBooleanClass, "booleanValue", "OZ"); and Value=(*env)→CallBooleanMethod (env, jPValue, jValueMethod).

Step d, store value of jValue in the buffer by invoking
*(pTemplate[n].pValue)=(jValue==JNI_TRUE)?TRUE: FALSE.

Step A-32, if type of jPValue is java/lang/Byte, java/lang/Character, java/lang/Integer, java/lang/Long, UlValueLen of CK_ULONG type is obtained by invoking pTemplate[n] .ulValueLen=sizeof(CK_ULONG).

For a java/lang/Long structure, for example, Step A-32 includes following steps.

Step a, allocate a buffer for pTemplate[n].pValue specifically by invoking
pTemplate[n].pValue=(CK_ULONG*) malloc(sizeof (CK_ULONG)).

Step b, obtain java/lang/Long structure by invoking
jclass jLongClass=(*env)→FindClass(env, "java/lang/Long").

Step c, convert jPValue into jLong type of jValue by invoking
jmethodID jValueMethod=(*env)→GetMethodID(env, jLongClass, "longValue", "( )J"), and
jValue=(*env)→CallBooleanMethod(env, jPValue, jValue Method).

Step d, store a value of jValue in the buffer by invoking *(pTemplate[n].pValue)=(CK_ULONG) jValue.

Step A-33, if types of jPValue are [Z, [B, [C, [I, [J, and for type [B as an example, UlValueLen of CK_ULONG type is obtained by invoking Template[n].ulValueLen=(*env)→GetArrayLength(env, jValue).

Step a, allocate a buffer for pTemplate[n].pValue by invoking pTemplate[n].pValue=(CK_BYTE*) malloc (pTemplate[n].ulValueLen*sizeof(CK_BYTE)).

Step b, convert jPValue into jbyte* type of jpTemp by invoking jbyte* jpTemp=(jbyte*) malloc (pTemplate[n].ulValueLen*sizeof(jbyte)), and (*env)→GetByteArrayRegion (env, jArray, 0, pTemplate[n].ulValueLen, jpTemp).

Step c, store value of jpTemp into the buffer by invoking for(i=0; i<pTemplate[n].ulValueLen; i++) {pTemplate[n].pValue[i]=CK_BYTE(jpTemp[i]);}.

Step A-34 includes the following steps in case that type of jPValue is java/lang/String.

Step a, convert jPValue into const char* type of pCharArray specifically by invoking jboolean isCopyand pCharArray=(*env)→GetStringUTFChars(env, jPValue, &isCopy).

Step b, obtain length of pCharArray, for example, value of pTemplate[n].ulValueLen, by invoking
pTemplate[n].ulValueLen=sizeof(pCharArray).

Step c, allocate a buffer for pTemplate[n].pValue by invoking pTemplate[n].pValue=(CK_UTF8CHAR_PTR) malloc((pTemplate[n].ulValueLen+1)*sizeof (CK_UTF8CHAR)).

Step d, store java/lang/String type of jPValue into the buffer by invoking
strcpy((char*) pTemplate[n].pValue, pCharArray); and
(*env)→ReleaseStringUTFChars(env, (jstring) jArray, pCharArray).

Step A-35 includes following steps in case that type of jPValue is pkcs11/wrapper/CK_DATE,
Structure of CK_DATE in the low layer interface is as below.

| {CK_CHAR | year[4]; |
| CK_CHAR | month[2]; |
| CK_CHAR | day [2];} |

Structure of CK_DATE in the invoking part is as below.

| public class CK_DATE { |
| public char[ ] year; |
| public char[ ] month; |
| public char[ ] day;} |

CK_ULONG ulValueLen is realized by invoking
pTemplate [n].ulValueLen=sizeof(CK_DATE).

Step a, allocate a buffer for pTemplate[n].pValue by invoking pTemplate[n].pValue=(CK_ULONG*) malloc (sizeof(CK_DATE)).

Step b, obtain structure of pkcs11/wrapper/CK_DATE by invoking
jclass jLongClass=(*env)→FindClass(env, "pkcs11/wrapper/CK_DATE").

Step c, store value of jPValue in the buffer.
Specifically, Step c includes following steps.

Step c-1, obtain a feature number of a preset member variable in the instance corresponding to the type by invoking
jfieldID jYearID=(*env)→GetFieldID(env, jDateClass, "year", "[C");
jfieldID jMonthID=(*env)→GetFieldID(env, jDateClass, "month", "[C"); and
jfieldID jDayID=(*env)→GetFieldID(env, jDateClass, "day", "[C").

Step c-2, obtain a value of a preset member variable by invoking jobject jYear=(*env)→GetObjectField(env, jDate, jYearID);
jobject jMonth=(*env)→GetObjectField(env, jDate, jMonthID); and
jobject jDay=(*env)→GetObjectField(env, jDate, jDayID).

Step c-3, convert the value of the member variable into jchar* type of data, jYear into jyearChars, jMonth into jmonthChars specifically by invoking jchar* jyearChars=(jchar*) malloc((*env)→GetArrayLength(env, jYear)*sizeof(jchar)); and (*env)→GetCharArrayRegion (env, jYear, 0, (*env)→Get ArrayLength(env, jYear), jyearChars).

Step c-4, store the obtained jchar* type of data in the buffer, specifically for jyearChars by invoking for(int i=0; (i<(*env)→GetArrayLength(env, jYear)) && (i<4); i++) {pTemplate[n].pValue→year[i]=(CK_CHAR) (jyearChars [i]);}.

Step A-36, in case that pTemplate[n].type is CKA_WRAP_TEMPLATE or structure of pValue of CKA_UNWRAP_TEMPLATE and CK_VOID_PTR is CK_ATTRIBUTE, execute steps following Step C-1 again.

Step A-37, in case that type of jPValue is other type,
pTemplate[n].pValue=NULL_PTR;
pTemplate[n].ulValueLen=0.

In the embodiment 4, the order of Step 404 and Step 405 is arbitrary; Step 404 can be executed before or after Step 405.

Step 406, invoke a low layer interface and access the smart key device to obtain a returned result.

Specifically, send CK_SESSION_HANDLE type of hSession in Step 404 and length ulCount of pTemplate and pTemplate in Step 405 to the low layerinterface by invoking CK_RV rv=C_FindObjectsInit(hSession, pTemplate, ulCount).

Step 407, determine whether the returned result is correct, if yes, go to Step 408; if no, discard an exception and end.

Specifically, in the case that the returned value of the low layer interface is not predefined Success, return the returned value of the low layer interface to the invoking part by discarding an exception; in the case that returned value of the low layer interface is predefined Success, send the returned value of the low layer interface and content in the buffer to the invoking part.

The discarding an exception includes following steps.

Step S1, obtain an invoking part exception type by invoking JNIEnv *env in JNI parameter list.

For an exception type "PKCS11Exception" as an example, obtain an invoking part exception type by invoking jclass errClass=(*env)→FindClass(env, "pkcs11/wrapper/PKCS11Exception"), in which "pkcs11/wrapper/PKCS11Exception" is a path of the exception type PKCS11Exception in the invoking part project.

Step S2, instantiate the invoking part exception by invoking JNIEnv *env in the JNI parameter list.

Specifically, obtain a predefined exception type of constructure function by invoking jmethodID jConstructor=(*env)→GetMethodID(env, errClass, "<init>", "( )V"); in which "<init>" refers to constructure function, "( )V" refers to a parameter and a returned value type and errClass is obtained in Step S1.

Instantiate the invoking part exception type by invoking jthrowable jOutOfError=(jthrowable)(*env)→NewObject (env, errClass, jConstructor).

Specifically, errClass is obtained in Step S1 and jConstructor is obtained by invoking GetMethodID.

Step S3, discard an exception by invoking JNIEnv *env in the JNI parameter list.

Specifically, discarding the exception is completed by invoking (*env)→Throw(env, jOutOfError), and the discarded exception is received by the invoking part, in which jOutOfError is obtained in Step S2.

Step 408, send the returned result to the invoking part.

In the embodiment 4, because there is not a returned value to be returned in the low layer interface function, invoke the return method directly and return the result to the invoking part.

Embodiment 5

A method for accessing a smart key device by a java card is provided in the Embodiment 5, including the following steps.

In the embodiment, 5 a method for obtaining object information inside the smart key device is taken as an example.

In case that a preset interface public void C_GetAttributeValue(long hSession, long hObject, CK_ATTRIBUTE[ ] pTemplate) throws PKCS11Exception is invoked, the following steps are executed.

Step 501, the JNI interface obtains a source parameter list.

Specifically, if a predefined interface "public void C_GetAttributeValue(long hSession, long hObject, CK_ATTRIB-UTE[ ] pTemplate) throws PKCS11Exception" is invoked, the java invokes JNI interface function JNIEXPORT void JNICALL Java_ pkcs11_wrapper_PKCS11Implementation_C_1GetAttributeValue (JNIEnv *env, jobject obj, jlong j SessionHandle, jlong jObjectHandle, jobjectArray jTemplate) with the JNI technology; in which the pkcs11_wrapper_PKCS11Implementation in the interface name refers to a path of a predefined interface in the invoking part project, for example, the predefined interface is in a type "PKCS11Implementation" of a packet name pkcs11.wrapper in invoking part.

The obtained parameter list is JNIEnv *env, jobject obj, jlong jSessionHandle, jlong jObjectHandle, jobjectArray jTemplate, in which JNIEnv *env, jobject obj is a parameter added by JNI interface for operating java data in JNI layer or for creating java data object and assigning a value to the java data object. The real source parameter list is jlong jSessionHandle, jlong jObjectHandle, jobjectArray jTemplate.

Step 502, determine a low layer interface function corresponding to JNI interface function according to a table in which one preset JNI interface function corresponds to one low layer interface function.

In the embodiment 5, the low layer interface function is

```
CK_RV C_GetAttributeValue(
    CK_SESSION_HANDLE hSession,
    CK_OBJECT_HANDLE hObject,
    CK_ATTRIBUTE_PTR pTemplate,
    CK_ULONG ulCount).
```

Step 503, determine a target parameter list according to the low layer interface function.

In the embodiment 5, the target parameter list is CK_SESSION_HANDLE hSession, CK_OBJECT_HANDLE hObject, CK_ATTRIBUTE_PTR pTemplate, CK_ULONG ulCount.

Step 504, convert the predefined local type of parameter in the source parameter list into a type identifiable by the low layer interface.

Specifically, Step 504 includes converting jlong type of jSessionHandle into CK_SESSION_HANDLE type of hSession compulsorily according to the first preset mapping table and convert the jlong type of jObjectHandle into CK_OBJECT_HANDLE type of hObject.

Step 505, convert the predefined reference type of parameter in the source parameter table into a type identifiable by the low layer interface.

The structure of the buffer is as below.

```
CK_ATTRIBUTE {
    CK_ATTRIBUTE_TYPE type,
    CK_VOID_PTR pValue;
    CK_ULONG ulValueLen;}
```

Structure of the invoking part is as below.

```
public class CK_ATTRIBUTE {
    public long type;
    public Object pValue;}
```

Specifically, Step 505 includes converting jobjectArray type of jTemplate into CK_ATTRIBUTE_PTR pTemplate according to the second mapping table and obtaining length "CK_ULONG ulCount" of the parameter jTemplate, and according to a preset interface definition, converting all pValue values in "type" and "pTemplate" into NULL_PTR and converting values of ulValueLen into 0 rather than converting value of pValue of the upper layer application.

The conversion includes steps as below.

Step A, obtain a structure of the member variable in the invoking part specifically by invoking jclass jAttribute-Class=(*env)→GetObjectClass(env, jAttribute).

Step B, obtain a feature code of the member variable in the instance corresponding to the type by invoking jfieldID jFieldID1=(*env)→GetFieldID(env, jAttribute Class, "type", "J").

Step C, obtain a value of the member variable by invoking jlong jType=(*env)→GetLongField(env, jAttribute, jFieldID1).

Step D, convert data type of the JNI interface of the value of the obtained member variable into a type identifiable by the low layer interface.

Specifically, the type value is obtained by invoking pTemplate[n].type=(CK_ATTRIBUTE_TYPE)jType, in which n is an integer greater than or equal to 0 and less than ulCount, and pTemplate[n].pValue=NULL_PTR, pTemplate[n].ulValueLen=0.

In the embodiment 5, the order of Step 504 and Step 505 is arbitrary and Step 504 can be executed before or after Step 505.

Step 506, invoke the low layer interface and access the smart key device to obtain length of member variable of the structure body by invoking CK_RV rv=C_FindObjectsInit (hSession,hObject, pTemplate), and sendingCK_SESSION_HANDLE type of hSession and CK_OBJECT_HANDLE type of hObject in Step 504 and length ulCount of CK_ATTRIBUTE_PTR type of pTemplate and pTemplate in Step 505 to the low layer interface.

Step 507, determine whether the returned result is correct, if yes, go to Step 508; if no, discard an exception and end.

Specifically, if the returned value of the low layer interface is not a preset Successful, return the returned value of the low layer interface to the invoking part by discarding an exception; if no, return the returned value of the low layer interface and content in the buffer to the invoking part.

Specifically, the discarding an exception includes steps as below.

Step S1, obtain an invoking part exception type by invoking JNIEnv *env in the JNI parameter list.

For an exception type PKCS11Exception as an example, the invoking part exception type is obtained by invoking jclass errClass=(*env)→FindClass(env, "pkcs11/wrapper/PKCS11Exception"), in which "pkcs11/wrapper/PKCS11Exception" is a path of the exception type PKCS11Exception in the invoking part project.

Step S2, instantiate the invoking part exception by invoking JNIEnv *env in the JNI parameter list.

Specifically, a preset exceptional constructure function is obtained by invoking jmethodID jConstructor=(*env)→GetMethodID(env, errClass, "<init>", "( )V"), in which "<init>" refers to the constructure function, "( )V" refers to the parameter and the returned value type and errClass is obtained in Step S1.

The invoking part exception type is instantiated by invoking jthrowable jOutOfError=(jthrowable) (*env)→NewObject(env, errClass, jConstructor).

Specifically, errClass is obtained in Step S1, and jConstructor is obtained by GetMethodID.

Step S3, discard an exception for the invoking part by invoking JNIEnv *env in the JNI parameter list.

Specifically, the exception is discarded by invoking (*env)→Throw(env, jOutOfError), and received by the invoking part; in which jOutOfError in Step S2.

Step 508, allocate a buffer for the structure body member variable pValue according to length of the obtained structure body member variable.

In the embodiment 5, the length of the structure body member variable is ulCount.

Specifically, in the embodiment 5, the structure body member variable is allocated to a buffer by invoking for(int n=0; n<ulCount; n++){pTemplate[n].pValue=malloc(pTemplate[n].ulCount);}.

Step 509, determine whether value of pTemplate[n].pValue is NULL_PTR, if yes, discard an exception and end; if no, invoke the low layer interface and access the smart key device to obtain a returned result; if the returned result is not correct, go to Step 510; if no, discard the exception.

Step 510, convert the returned result into JNI interface type and return the converted result to the invoking part.

The conversion includes steps as below.

Step 510-1, obtain CK_ATTRIBUTE type of the invoking part by invoking JNIENV *env in the JNI parameter list, In the embodiment 5, for example, obtain CK_ATTRIBUTE type of the invoking part by invoking jclass jAttributeClass=(*env)→FindClass(env, "pkcs11/wrapper/CK_ATTRIBUTE"), in which "pkcs11/wrapper/CK_ATTRIBUTE" is a path of the preset CK_ATTRIBUTE type in the invoking part project.

Step 510-2, create an instance for CK_ATTRIBUTE type by invoking JNIENV *env in the JNI parameter list, for example by invoking jobject jAttribute=(*env)→AllocObject(env, jAttributeClass).

Step 510-3, obtain a feature number of the preset member variable in the instance of the type specifically by invoking
jfieldID jFieldID1=(*env)→GetFieldID(env, jAttributeClass, "type", "J"); and
jfieldID jFieldID2=(*env)→GetFieldID(env, jAttributeClass, "pValue", "Ljava/lang/Object;").

Step 510-4, convert the returned content of the low layer interface into a jobject type of jAttribute according to the member variable type in a preset structure of the returned content of the low layer interface and the member variable type of the structure of the invoking part.

Step 510-4 includes the following steps.

Firstly, convert CK_ULONG type into jlong type compulsorily according to the first preset mapping table by invoking jlong type=(jlong)(pTemplate[n].type).

Secondly, convert CK_VOID_PTR type and CK_ULONG type into jobject type of jValueObject according to the second preset mapping table.

The conversion is decided by type of "type".

In case that "type" is

```
CKA_CLASS
CKA_KEY_TYPE
CKA_CERTIFICATE_TYPE
CKA_HW_FEATURE_TYPE
CKA_MODULUS_BITS
CKA_VALUE_BITS
CKA_VALUE_LEN
CKA_KEY_GEN_MECHANISM
CKA_PRIME_BITS
CKA_SUB_PRIME_BITS
CKA_CERTIFICATE_CATEGORY
CKA_JAVA_MIDP_SECURITY_DOMAIN
CKA_AUTH_PIN_FLAGS CKA_VENDOR_DEFINED,
CK_VOID_PTR
``` refers to a first address of CK_ULONG type of data and the converting includes
obtaining the long type by invoking jclass jLongClass=(*env)→FindClass(env, "java/lang/Long");
obtaining the initialization function by invoking jmethodID jConstructor=(*env)→GetMethodID(env, jValueObjectClass, "<init>", "(J)V"); and
creating the instance for the type and assigning value to it.

The creating and assigning specifically includes converting PValue of CK_VOID_PTR type into the jlong type of jValue compulsorily, for example, jlong jValue=(jlong)(*pTemplate[n].pValue); and
assigning a value for jValueObject by invoking jobject jValueObject=(*env)→NewObject(env, jValue ObjectClass, jConstructor, jValue).

In case that "type" is

```
CKA_VALUE
CKA_OBJECT_ID
CKA_SUBJECT
CKA_ID
CKA_ISSUER
CKA_SERIAL_NUMBER
CKA_OWNER
CKA_AC_ISSUER
CKA_ATTR_TYPES
CKA_ECDSA_PARAMS
CKA_EC_POINT
CKA_PRIVATE_EXPONENT
CKA_PRIME_1
CKA_PRIME_2
CKA_EXPONENT_1
CKA_EXPONENT_2
CKA_COEFFICIENT
CKA_CHECK_VALUE
CKA_HASH_OF_SUBJECT_PUBLIC_KEY
CKA_HASH_OF_ISSUER_PUBLIC_KEY
CKA_MODULUS
CKA_PUBLIC_EXPONENT
CKA_PRIME
CKA_SUBPRIME
CKA_BASE,
```

CK_VOID_PTR is a first address of the CK_BYTE array and the converting includes converting CK_BYTE[ ] into the jbyte* type by invoking jbyte* jpTemp=(jbyte*) malloc(sizeof (pTemplate[n].length)*sizeof(jbyte)), and for (int i=0; i<sizeof (pTemplate[n].length); i++) {jpTemp[i]=(jbyte) ((CK_BYTE[ ])(pTemplate[n].pValue)[i]);}, and converting the jbyte* type of data into jbyteArray type of data according to JNIEnv *env in a JNI parameter list which specifically includes allocating a buffer for the jArray by invoking jbyteArray jArray=(*env)→NewByteArray(env, jsize(pTemplate[n].length*sizeof(jbyte))), and storing the content in jbyte* into the buffer of jArray by invoking (*env)→SetCharArrayRegion(env, jArray, 0, jsize (pTemplate[n].length*sizeof(jbyte)), jpTemp).

The jbyteArray type of jArray is jValueObject, viz. jValueObject=(jobject)jArray.

In case that "type" is

| |
|---|
| CKA_RESET_ON_INIT |
| CKA_HAS_RESET |
| CKA_TOKEN |
| CKA_PRIVATE |
| CKA_MODIFIABLE |
| CKA_DERIVE |
| CKA_LOCAL |
| CKA_ENCRYPT |
| CKA_VERIFY |
| CKA_VERIFY_RECOVER |
| CKA_WRAP |
| CKA_SENSITIVE |
| CKA_SECONDARY_AUTH |
| CKA_DECRYPT |
| CKA_SIGN |
| CKA_SIGN_RECOVER |
| CKA_UNWRAP |
| CKA_EXTRACTABLE |
| CKA_ALWAYS_SENSITIVE |
| CKA_NEVER_EXTRACTABLE |
| CKA_TRUSTED |
| CKA_WRAP_WITH_TRUSTED |
| CKA_ALWAYS_AUTHENTICAT, |

Obtaining a boolean type by invoking jclass jValueObjectClass=(*env)→FindClass(env, "java/lang/Boolean"), obtaining an initialization function by invoking jmethodID jConstructor=(*env)→GetMethodID(env, jValueObjectClass, "<init>", "(Z)V"), and creating an instance for the type and assigning a value for the instance by invoking jboolean jValue=(*(CK_BBOOL) pTemplate[i].pValue==TRUE)? JNI_TRUE:JNI_FALSE; and jobject jValueObject=(*env)→NewObject(env, jValueObjectClass, jConstructor, jValue).

In case that "type" is

| |
|---|
| CKA_LABEL |
| CKA_APPLICATION |
| CKA_URL, |

CK_VOID_PTR is the first address of CK_CHAR array and the converting includes converting CK_CHAR[ ] into the jbyte* type specifically by invoking jchar* jpTemp=(jchar*) malloc(sizeof (pTemplate[n].length)*sizeof(jchar)), and for(int i=0; i<sizeof (pTemplate[n].length); i++) {jpTemp[i]=(jbyte)((CK_CHAR[ ])(pTemplate[n].pValue)[i]);}, converting the jbyte* type of data into jcharArray type of data by invoking JNIEnv *env in JNI parameter list which specifically includes allocating a buffer for jArray by invoking jcharArray jArray=(*env)→NewByteArray(env, jsize (pTemplate[n].length*sizeof(jchar))), and storing the content of jchar* in the buffer of jArray by invoking (*env)→SetCharArrayRegion(env, jArray, 0, jsize (pTemplate[n].length*sizeof(jchar)), jpTemp).

The jcharArray type of jArray is jValueObject, viz. jValueObject=(jobject)jArray.

In case that "type" is

| |
|---|
| CKA_START_DATE |
| CKA_END_DATE, |

CK_VOID_PTR is CK_DATE type of data, in which structure returned by CK_DATE low layer includes obtaining CK_DATE type of the invoking part by invoking JNIENV *env in the JNI parameter list, for example by invoking jclass jValueObjectClass=(*env)→FindClass(env, "pkcs11/wrapper/CK_DATE");

creating an instance for CK_DATE type by invoking JNIENV *env in the JNI parameter list, for example by invoking jobject jValueObject=(*env)→AllocObject(env, jValueObjectClass);

sending the content returned by the low layer interface to instance jValueObject of the type.

Step A, obtain a feature number of the preset member variable in the instance of the type specifically by invoking fieldID1=(*env)→GetFieldID(env, jValueObjectClass, "year", "[C");

fieldID2=(*env)→GetFieldID(env, jValueObjectClass, "month", "[C"); and fieldID3=(*env)→GetFieldID(env, jValueObjectClass, "day", "[C").

Take conversion of "year" member of CK_DATE as an example.

(1) convert CK_CHAR[ ] type of year into the jbyte* type by invoking jchar* jpTemp=(jchar*) malloc(4*sizeof(jchar)), and for(int i=0; i<4; i++) {jpTemp[i]=(jbyte)(((CK_DATE) (pTemplate[n].pValue).year[i]));}.

(2) convert the jbyte* type of data into the jcharArray type of data by invoking JNIEnv *env in JNI parameter list which includes allocating a buffer for jArray by invoking jcharArray jArray=(*env)→NewByteArray(env, jsize(pTemplate[n].length*sizeof(jchar))), and storing content of jchar* in the buffer of jArray by invoking (*env)→SetCharArrayRegion(env, jArray, 0, jsize (pTemplate[n].length*sizeof(jchar)), jpTemp).

Storing data of jArray in the buffer jArray is executed by invoking (*env)→SetObjectField(env, jValueObject, fieldID1, jArray).

Step 510-5, store the jValueObject in the buffer jAttribute.

Specifically, send the converted result jValueObject to jAttribute by invoking (*env)→SetObjectField(env, jAttribute, fieldID, jValueObject).

Step 510-6, return the created instance jAttribute of the type by invoking a "return" method.

Embodiment 6

A method for accessing a smart key device by a java application is provided in the Embodiment 6, including the following steps.

In the embodiment 6, a method for generating a digital signature with an object inside the smart key device is taken as an example.

In case that a preset interface public native byte[ ] C_Sign(long hSession, byte[ ] pData) throws PKCS11Exception is invoked, the following steps are executed.

Step 601, the JNI interface obtains a source parameter list.

Specifically, in case that a preset interface public native byte[ ] C_Sign(long hSession, byte[ ] pData) throws PKCS11Exception is invoked, the java invokes JNI interface function JNIEXPORT jbyteArray JNICALLJava_pkcs11_wrapper_PKCS11Implementation_C_1Sign (JNIEnv *env, jobject obj, jlong jSessionHandle, jbyteArray jData) with the JNI technology, in which pkcs11_wrapper_PKCS11Implementation in the interface name is a path of the preset interface in the invoking part project, for example, the preset interface is in a type PKCS11Implementation of packet name pkcs11.wrapper of the invoking part; the obtained parameter list is JNIEnv *env, jobject obj, jlong jSessionHandle, jbyteArray jData in which JNIEnv *env, jobject obj refers to a parameter added by the JNI interface for operating the java data at JNI layer or creating java data object and assigning a value for the java data object; the real source parameter list is jlong jSessionHandle, jbyteArray jData.

Step 602, determine a low layer interface function corresponding to the JNI interface function according to a table in which one preset JNI interface function corresponds to one low layer interface function.

In the embodiment 6, the low layer interface function is

```
CK_RV C_Sign(
CK_SESSION_HANDLE hSession,
CK_BYTE_PTR          pData,
CK_ULONG             ulDataLen,
CK_BYTE_PTR          pSignature,
CK_ULONG_PTR         pulSignatureLen).
```

Step 603, determine a target parameter list according to the low layer interface function.

Specifically, the target parameter list is CK_SESSION_HANDLE hSession, CK_BYTE_PTR pData, CK_ULONG ulDataLen, CK_BYTE_PTR pSignature, CK_ULONG_PTR pulSignatureLen.

Step 604, convert a predefined local type of parameter in the source parameter list into a type identifiable by the low layer interface.

Specifically, convert the jlong type of the jSessionHandle into the CK_SESSION_HANDLE type of hSession according to the first preset mapping table compulsorily.

Step 605, convert the predefined reference type of parameter in the source parameter list into a type identifiable by the low layer interface.

Specifically, convert the jbyteArray type of jData into CK_BYTE_PTR type of pData and length ulDataLen of the parameter jData according to the second preset mapping table.

Step 605 includes the following steps.

Step 605-1, obtain the length of the parameter jData and allocate a storage buffer according to length of the parameter, which specifically includes obtaining length of the parameter jData by invoking CK_ULONG ulDataLen= (*env)→Get ArrayLength(env, jData) and allocating the storage buffer for the parameter pData by invoking CK_BYTE_PTR pData=(CK_BYTE_PTR) malloc (ulDataLen*sizeof(byte)). Step 605-2, convert jbyteArray type into jbyte* type of jpTemp, which specifically includes
allocating a buffer for jpTemp by invoking
jpTemp=(jbyte*)malloc ((ulDataLen)*sizeof(jbyte)), and storing jbyteArray into jpTemp according to JNIEnv *env in the JNI parameter list by invoking (*env)→GetByteArrayRegion(env, jArray, 0, ulDataLen, jpTemp).

Step 605-3, convert the jpTemp of the jbyte* into the pData of the CK_BYTE_PTR specifically by invoking for (int i=0; i<ulDataLen; i++) {pData[i]=(CK_BYTE)jbyte[i];}.

Step 606, allocate a buffer according to a preset size.

Specifically, the buffer is only allocated for the return length rather than the returned value. If first address of the returned value is NULL_PTR, i.e.
CK_BYTE_PTR pSignRet=NULL_PTR;
CK_ULONG ulSignRetLen=0.

Step 607, invoke the low layer interface and access the smart key device to obtain are turned result.

Step 608, determine whether the returned result is correct, if yes, go to Step 609; if no, discard an exception and end the process.

Specifically, if the returned value of the low layer interface is not a predefined Success, return the returned value of the low layer interface to the invoking part by discarding the exception; if the returned value of the low layer interface is a predefined Success, return the returned value of the low layer interface and content in the buffer to the invoking part.

The discarding the exception includes following steps.

Step S1, obtain an invoking part exception type by invoking JNIEnv *env in JNI parameter list.

Specifically, for PKCS11Exception exception type, obtain the invoking exception type by invoking jclass errClass=(*env)→FindClass(env, "pkcs11/wrapper/PKCS11Exception"), in which "pkcs11/wrapper/PKCS11Exception" is a path of the exception type PKCS11Exception in the invoking part project.

Step S2, instantiate the invoking part exception type by invoking JNIEnv *env in JNI parameter list.

Specifically, Step S2 includes obtaining a preset exception type of constructive function by invoking jmethodID jConstructor=(*env)→GetMethodID(env, errClass, "<init>", "( )V"), in which "<init>" refers to the constructive function, "( )V" refers to the parameter and type of the returned value and errClass is obtained in Step S1; also includes initiating the invoking part exception type by invoking jthrowable jOutOfError=(jthrowable) (*env)→NewObject (env, errClass, jConstructor).

Specifically, errClass is obtained in Step S1, and jConstructor is obtained by invoking GetMethodID.

Step S3, discard an exception for the invoking part by invoking JNIEnv *env in JNI parameter list.

Specifically, the exception is discarded by invoking (*env)→Throw(env, jOutOfError) and received by the invoking part, in which jOutOfError is obtained in Step S2.

Step 609, allocate a buffer for pSignRet with length returned by the low layer interface by invoking pSignRet=(CK_BYTE_PTR)malloc (ulSignRetLen*sizeof(CK_BYTE)).

Step 610, invoke the low layer interface, and access the smart key device to obtain a returned result.

Step 611, determine whether the returned result is correct, if yes, go to Step 612; if no, discard the exception, and end the process.

The discarding step herein is the same as the above discarding step and thus details of it are eliminated.

Step 612, convert the returned result into JNI interface type and return.

Specifically, Step 612 includes the following steps.

Step 612-1, convert CK_BYTE type into jbyte* type by invoking jbyte*jpTemp=(jbyte*) malloc(ulSignRetLen*sizeof (jbyte)), and for(int i=0; i<ulSignRetLen; i++) {jpTemp[i]=(jbyte) pSignRet[i];}.

Step 612-2, convert the jbyte* type of data into the jbyteArray type of data by invoking JNIEnv *env in the JNI parameter list.

Specifically, Step 612-2 includes allocating a buffer for jArray by invoking jbyteArray jArray=(*env)→NewbyteArray(env,jsize (ulSignRetLen*sizeof(jbyte))), and storing the content of the jbyte* into the buffer of the jArray by invoking (*env)→SetbyteArrayRegion(env, jArray, 0, jsize(ulSignRetLen*sizeof(jbyte)), jpTemp).

Step 612-3, return the jbyteArray type of the jArray to the invoking part by invoking a return method.

The above mentioned are only preferred embodiments of the invention, not a limitation to the invention, any amendment or substitution made by those skilled in the art within the scope of technology disclosed by the invention should fall within the scope of protection of the invention. Therefore, the scope of protection of the invention should be based on the appended claims.

The invention claimed is:

1. A method for accessing a smart key device storing a digital certificate or a user key, the digital certificate or user key is accessed by a java application on a computing device, the smart key device has lower layer interface with target parameters that is invoked by a JNI (Java Native Interface) interface from the computing device, the computing device comprising a table that includes a source parameter list and has one preset JNI interface function corresponding to one lower layer interface function, the method for accessing the digital certificate or user key on the smart key device by the java application on the computing device includes the steps of:

Step 101, obtaining the source parameter list by the JNI interface;

Step 102, determining the lower layer interface function corresponding to the JNI interface function according to the table;

Step 103, determining a target parameter list according to the lower layer interface function;

Step 104, sending a value of the source parameter list to the corresponding lower layer interface parameter according to the target parameter list of the lower layer interface;

Step 105, invoking the lower layer interface and accessing the smart key device so as to obtain a returned result; and Step 106, sending the returned result obtained as above to the invoking part;

discarding an exception and then ending if the returned result is not correct; and thereafter accessing the digital certificate or user key on the smart key device.

2. The method of claim 1, wherein in Step 102, there are a plurality of interface function pairs in the table in which one preset JNI interface function corresponds to one lower layer interface function, and there are one JNI interface function and one lower layer interface function corresponding to the JNI interface function in each interface function pair, and in case that one JNI interface function is invoked, the corresponding lower layer interface function is searched according to the table in which one JNI interface function corresponds to one lower layer interface function.

3. The method of claim 1, wherein in Step 104, in the case that the lower layer interface is of a pre-defined simple data type, searching a first preset mapping table according to the pre-defined simple data type required by the lower layer interface and a parameter of the pre-defined local type in a source parameter list, obtaining a type pair including the parameter of the pre-defined local type from the first preset mapping table so as to obtain the pre-defined simple data type required by the lower layer interface function corresponding to the predefined local type, and obtaining the parameter required by the lower layer interface by compulsory type conversion.

4. The method of claim 1, wherein in Step 104, in the case that the lower layer interface function is of a complex data type, searching a second preset mapping table according to the pre-defined complex data type required by the lower layer interface and a parameter of the pre-defined reference type in a source parameter list, obtaining a type pair including the parameter type of the pre-defined reference type from the second preset mapping table, so as to obtain the pre-defined complex data type required by the lower layer interface corresponding to the pre-defined reference type.

5. The method of claim 1, wherein Step 106 comprises:

Step 106-1, determining whether the returned result is correct by comparing whether the result is identical to a lower layer macro definition, if yes, going to Step 106-2; otherwise, discarding an exception, and then ending;

Step 106-2, returning a value of the returned result to an invoking part.

6. The method of claim 5, wherein Step 106-1 comprises:

determining whether the returned result of the lower layer interface is the pre-defined Successful, if yes, determining that the returned result is correct and going to Step 106-2; otherwise, determining that the returned result is not correct, discarding an exception, and then ending all process.

7. The method of claim 1, wherein the discarding an exception comprises:

Step A, obtaining an invoking part exceptional type according to a parameter in the source parameter list;

Step B, instantiating the invoking part exception according to the parameter in the source parameter list; and Step C, discarding the exception for the invoking part according to the parameter in the source parameter list.

8. The method of claim 5, wherein the discarding an exception comprises:

Step A, obtaining an invoking part exceptional type according to a parameter in the source parameter list;

Step B, instantiating the invoking part exception according to the parameter in the source parameter list; and Step C, discarding the exception for the invoking part according to the parameter in the source parameter list.

9. The method of claim 6, wherein the discarding an exception comprises:

Step A, obtaining an invoking part exceptional type according to a parameter in the source parameter list;

Step B, instantiating the invoking part exception according to the parameter in the source parameter list; and Step C, discarding the exception for the invoking part according to the parameter in the source parameter list.

10. The method of claim 1, wherein the returning the returned result to the invoking part obtained in Step 106 comprises:

Step S1, obtaining the invoking part type;
Step S2, creating the type instance;
Step S3, sending a content returned by the lower layer interface to the type instance; and
Step S4, returning the created type instance to the invoking part.

11. The method of claim 10, wherein Step S3 comprises:

Step S3-1, obtaining a first address in where a pre-defined member variable is in the buffer storing the type instance;
Step S3-2, converting the type of the content returned by the lower layer interface into the JNI interface type according to the type of pre-defined member variable of the content returned by the lower layer interface and the member variable type of the structure of the invoking part; and
Step S3-3, sending the converted content to the type instance.

12. The method of claim 1, wherein the returning the returned result to the invoking part obtained in Step 106 comprises:

in case that the type of the content returned by the lower layer interface is the pre-defined simple data type, converting the parameter of the pre-defined simple data type into the JNI interface type by a compulsory conversion according to the first preset mapping table, and then returning a value of the obtained JNI interface type to the invoking part; while in case that the type of the content returned by the lower layer interface is a pre-defined complex data type, converting the parameter of the pre-defined reference type into the JNI interface type according to the second preset mapping table, and then returning a value of the JNI interface type to the invoking part.

13. The method of claim 12, wherein in case that the type of the content returned by the lower layer interface is a pre-defined complex data type, converting the parameter of the pre-defined reference type into the JNI interface type according to the second mapping table, and then returning a value of the obtained JNI interface type to the invoking part, which comprises:

Step B1, obtaining a length of the content returned by the lower layer interface, and allocating a third buffer according to the length;
Step B2, storing the content returned by the lower layer interface into the third buffer;
Step B3, allocating a fourth buffer for the stored data in the JNI interface;
Step B4, storing the stored data into the fourth buffer.

* * * * *